United States Patent
Bouziane

[11] Patent Number: 5,821,396
[45] Date of Patent: Oct. 13, 1998

[54] BATCH PROCESS FOR RECYCLING HYDROCARBON CONTAINING USED MATERIALS

[76] Inventor: Richard Bouziane, 1630 Chemin du Brûlé, St-Antoine-sur-Richelieu, Quebec, Canada, J0L 1R0

[21] Appl. No.: 791,152

[22] Filed: Jan. 28, 1997

[51] Int. Cl.[6] .............................. C07C 1/00; C08J 11/00; C10B 53/00
[52] U.S. Cl. .......................... 585/241; 585/240; 201/2.5; 201/25; 521/40.5; 521/41; 521/45.5
[58] Field of Search ..................... 585/241, 240; 201/2.5, 25; 423/449.1; 521/40.5, 41, 45.5

[56] References Cited

U.S. PATENT DOCUMENTS

| | | | |
|---|---|---|---|
| 4,250,158 | 2/1981 | Solbakken et al. | 423/449 |
| 5,095,040 | 3/1992 | Ledford | 521/40.5 |
| 5,264,640 | 11/1993 | Platz | 585/241 |
| 5,662,052 | 9/1997 | McIntosh et al. | 110/346 |

Primary Examiner—Bekir L. Yildirim
Attorney, Agent, or Firm—François Martineau

[57] ABSTRACT

A pyrolysis batch process is disclosed for recycling hydrocarbon containing used material such as plastics including ABS, polystyrene styrene and other non-chlorinated hydrocarbons, car fluff such as solid plastics, foam plastics, fabrics and the like, and more particularly scrap tires so as to obtain useful light oil and fuel gases. Used tire cuttings are loaded into a rotatable reactor which is closed, evacuated, rotated and heated until exothermic reaction is initiated. The reactor internal pressure is then allowed to increase to and is regulated within the range of atmospheric pressure and above. Upon continuing reactor rotation and heating, condensable hydrocarbon vapors and gaseous hydrocarbons are produced. The vapors are condensed into oil while the gaseous hydrocarbons are used as a fuel for reactor heating. At the end of the batching operation, the reactor is air cooled prior to reactor opening and unloading of the solid residues namely carbon black residues, wire mesh and/or some other fibrous materials such as Kevlar® having a high temperature decomposition point.

14 Claims, 3 Drawing Sheets

BATCH PROCESS FOR RECYCLING HYDROCARBON CONTAINING USED MATERIALS

FIELD OF THE INVENTION

The present invention relates to the recycling of hydrocarbon containing used material by a pyrolysis process and more particularly for recycling used rubber tires by vacuum pyrolysis.

BACKGROUND OF THE INVENTION

U.S. Pat. No. 4,740,270 dated Apr. 26, 1988, title: Vacuum pyrolysis of scrap tires, inventor Christian Roy, describes a process wherein pyrolysis of used tires is carried out at a temperature in the range of about 360 degrees C. to about 415 degrees C. under a sub-atmospheric pressure of less than about 35mm of mercury so as to produce gases, liquid hydrocarbons, both used as fuels and solid carbon black powder. Since the process described in this patent is carried out under vacuum and most probably a continuous process although this is not specified in this patent, a gas lock must certainly be required at the inlet and the outlet of the process reactor. Due to the pressure differential involved, a gas lock of very high density such as mercury would most probably be required. Such mercury gas lock might contaminate the carbon black, which would then be useless for recycling.

U.S. Pat. No. 4,839,021 dated Jun. 13, 1989 entitled "Treatment of Petroleum Derived Organic sludges and oil residues", inventor Christian Roy, describes a similar vacuum Pyrolysis process but applied to the recycling of petroleum derived organic sludges or oil residues. The same remarks as above also apply to this process.

OBJECTS OF THE PRESENT INVENTION

It is therefore the general object of the present invention to provide a process for recycling hydrocarbon containing used material which consists of effecting pyrolysis of this material in a batch process to obtain non contaminated products suitable for recycling, for instance not only oil and hydrocarbon gases usable as fuels but also usable powdered carbon black when the material is used rubber tires.

Another other object of the present invention is to provide a pyrolysis batch process in which gas and vapor phase secondary cracking reaction is positively prevented so that the process can be carried out with maximum safety and with a maximum yield ratio of oil to gas.

Another object of the present invention is to provide a process of the character described in which the gaseous hydrocarbons are used at least in part, for heating the reactor so as to minimize fuel requirements for the process and in which excess gaseous hydrocarbons can be used for steam generation or the like.

Another object of the present invention is to provide a process of the character described which pyrolysis of the rubber tires is thorough so that pure carbon black in powder form is recuperated.

Another object of the present invention is the provision of the process of the character described in which the processing capacity is a maximum compared to the size of the equipment required to carry out the process.

SUMMARY OF THE INVENTION

The pyrolysis batch process of the invention is for recycling hydrocarbon containing used material and comprises the consecutive steps of:

a) loading said material into a rotatable reactor, closing the latter and removing oxygen from within said reactor;

b) rotating said reactor about a substantially horizontal axis while heating the same from the exterior until exothermic reaction is initiated within said reactor;

c) regulating the reactor internal pressure within the range of atmospheric pressure and above upon initiation of and during said exothermic reaction to prevent gas and vapor phase secondary cracking reaction;

d) continuing reactor rotation and heating while withdrawing therefrom condensable hydrocarbon vapors and gaseous hydrocarbons produced by said exothermic reaction;

e) condensing said vapors into oil and separately collecting said gaseous hydrocarbons; and f) unloading any solid residues from said reactor.

Preferably, the gaseous hydrocarbons collected in step e) is used as a fuel for heating said reactor in steps b) and d).

Preferably, the reactor is air cooled between steps e) and f).

The process of the invention is more specifically applied to the recycling of used rubber tires loaded as tire cuttings in step a) and wherein oxygen removal in step a) is effected by withdrawing air by means of a vacuum pump until a sub-atmospheric pressure of less than about 35 mm of mercury is obtained within said reactor and heating of said reactor in step b) is effected until the tire cuttings in said reactor attain a temperature of 435 degrees C. to 500 degrees C., and further including stopping operation of said vacuum pump and decreasing said external reactor heating upon initiation of said exothermic reaction, and wherein said solid residues unloaded in step f) include carbon black powder and steel wires.

Preferably the batch process further includes the steps of continuously analyzing the total hydrocarbon content of the gaseous hydrocarbons collected in step e) and using as a fuel for heating the reactor only those gaseous hydrocarbons having more than about 50% T.H.C. and burning to waste the remaining gaseous hydrocarbons.

Preferably, upon accidental air leakage into said reactor while under vacuum, the reactor is flooded with pressurized inert gas.

Preferably, reactor rotation and heating in step b) are effected at a low speed and high rate respectively, then during said exothermic reaction in steps c) and d), reactor heating is lowered while reactor rotation is kept at the same speed.

Preferably, the reactor pressure during steps c) and d) is regulated between 780 to 790 mm of mercury to obtain a maximum yield ratio of oil to gas.

Preferably, the batch process further includes the steps of continuously analyzing the total hydrocarbon content of the gaseous hydrocarbons collected in step e) and further increasing the drum rotational speed and the drum heating when the total hydrocarbon content of the gases collected in step e) falls below 50% to cause increase of the total hydrocarbon content of the gases being collected and repeating this cycle at least two times to practically completely collect the hydrocarbon contents of said tire cuttings so as to leave substantially only carbon black and steel wires as solid residues in step f).

Preferably, the rotatable reactor is of generally cylindrical shape with end walls, one end wall having an access opening offset with respect to the reactor rotation axis and wherein reactor loading in step a) is effected while said access opening is at substantially 12.00 o'clock and reactor unloading in step f) is effected while said access opening is at substantially 6.00 o'clock and by sucking away said solid residues.

DETAILED DESCRIPTION OF THE PREFERRED EMBODIMENTS OF THE PROCESS OF THE INVENTION

Figure 1:
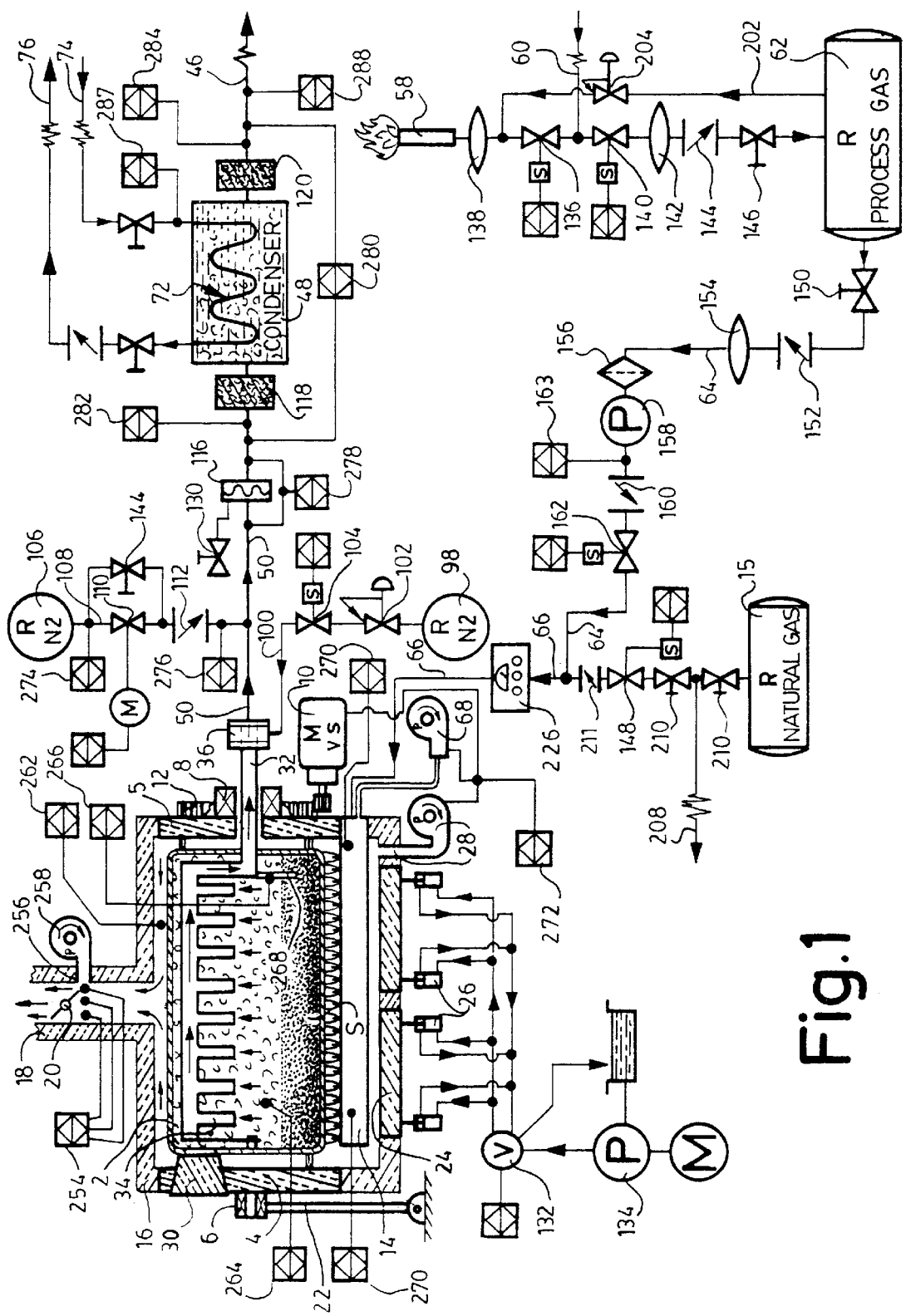
FIG. 1 is a schematic view of the first part of a flow diagram of the equipment used for carrying out the pyrolysis process in accordance with the present invention.

The apparatus and equipment used for carrying out the process in accordance with the present invention is described and claimed in a co-pending patent application entitled "Pyrolysing Apparatus", co-inventors, Rodier Michaud and Richard Bouziane filed on Dec. 20th, 1996. As schematically shown in FIG. 1, the apparatus comprises a reactor 2 of cylindrical shape rotatable about a horizontal axis. The end walls of the reactor 2 are supported by coaxial insulated discs 4 and 5. Disc 4 is rotatably supported by a front bearing 6 and disc 5 is supported by a back bearing 8 and driven at a variable speed by a variable speed motor 10 and speed reducer and crown gear 12 fixed to the back insulated disc 5. Reactor 2 which is made of steel is heated from the exterior by a gas burner 14; reactor 2 is spacedly surrounded by a heat insulating sheath 16 fitted with a chimney 18 in which is located a motorized damper 20. Bearing 6 is mounted at the end of a lever 22 so as to be horizontally shiftable to allow for thermal expansion and contraction of the reactor drum 2. Sheath 16 is provided with ventilation openings disposed below the reactor drum 2 and normally closed by trap doors 24 operable between open and closed positions by double-acting hydraulic cylinders 26. Trap doors 24 can be arranged to open by gravity and to close by single acting pneumatic cylinders.

Cooling air for the reactor drum may be additionally circulated by an air fan 28. The front end wall of reactor 2 has an access opening which is off-set with respect to the reactor rotation axis, this opening being closed by door 30. Door 30 is opened to load the materials to be recycled and to unload any solid residues. The pyrolytic vapors and gases are discharged to the exterior by a discharge tube 32 which is firmly secured against rotation at the exterior of the drum and is provided at the inside of the drum with a series of filters 34. A rotary joint 36 between fixed tube 32 and rotating reactor drum 2 prevents outside air from entering the drum when the same is under vacuum.

Figure 2:
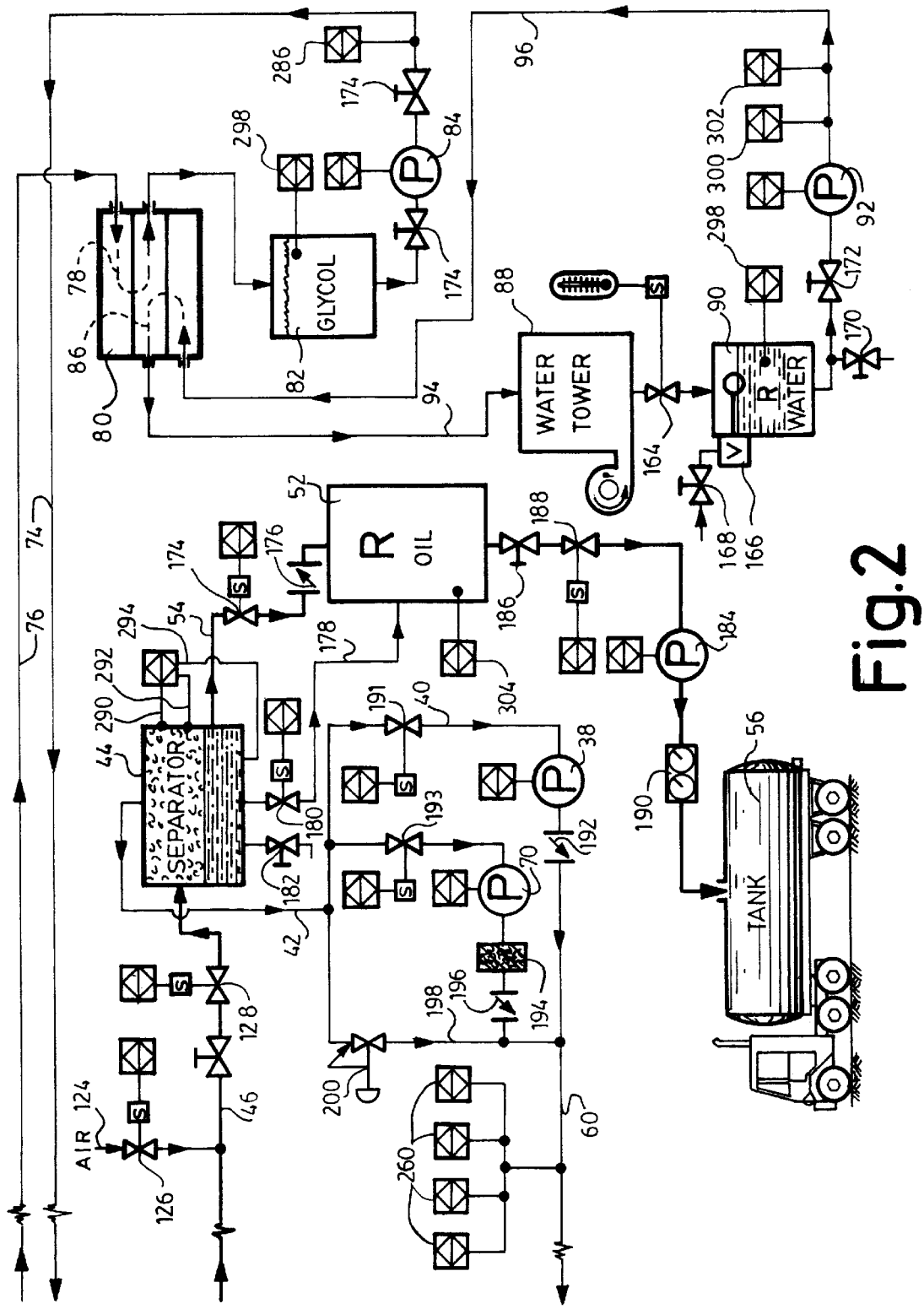
FIG. 2 is a continuation of the flow diagram of FIG. 1

Drum 2 is initially evacuated by a double-stage vacuum pump 38 (see FIG. 2) connected to the discharge tube 32 through line 40, 42, separator 44, line 46 condenser 48 and line 50. The evacuated air is discharged to the atmosphere through check valve 192, line 60, solenoid valve 136, flame arrester 138 and flare 58. The tire cuttings form vapors and gases which are filtered through filters 34, the vapors are condensed in condenser 48 and the oil and gas mixture flows through line 46 into separator 44 from which the oil component is fed to an oil reservoir 52 through line 54. The oil from reservoir 52 is sold as fuel oil to be transported by tank trucks 56.

The gas component from separator 44 is fed to line 60 through line 42, pressure regulating valve 200 an line 198.

The gas which is initially produced is poor in total hydrocarbon content and is fed to the flare 58 through line 60; upon its total hydrocarbon content reaching a minimum level, the gas is fed from line 60 to a process gas reservoir 62 from which the process gas is directed to gas burner 14 through lines 64, 66 after switching off natural gas reservoir 15. Gas burner 14 is supplied with combustion air by air fan 68.

As soon as the exothermic reaction takes place within reactor drum 2, vacuum pump 38 is stopped; the reactor internal pressure rises to above atmospheric pressure and the gas is directed through valve 200 which is normally set at about 5 psi.

Condenser 48 has a cooling coil 72 which is fed with cold water mixed with glycol through a cooling circuit including lines 74, 76, one side 78 of a heat exchanger 80, water and glycol reservoir 82 and circulating pump 84. Heat exchanger 80 has a cooling coil 86 connected in a cooling circuit including water tower 88, water reservoir 90, circulating pump 92 and line 96. Part of lines 74, 76 may be exposed to external below 0° C. weather hence glycol addition to the cooling water.

A first source of nitrogen 98 is connected by line 100 to the rotary joint 36. Nitrogen from pressurized reservoir 98 is admitted through pressure regulating valve 102 and solenoid valve 104. A second nitrogen source 106 is connected to line 50 through side line 108 provided with motorized valve 110, check valve 112 and manual by-pass valve 114 by-passing motorized valve 110. Second nitrogen source 106 is used during the back wash of the filters in the system to sweep away any residual air in the piping. The inlet of condenser 48 is provided with a primary filter 116 and a secondary filter 118. The outlet of condenser 48 has a secondary filter 120. Filters 116, 118 and 120 filter out any solid particles which might have passed through rotary drum filters 34. After a certain time of operation, these filters 116, 118 and 120 must be back washed. For this purpose, a source of air under pressure 124 is admitted into line 46 upon opening of solenoid valve 126 and closing of solenoid valve 128; air circulates in reverse direction across the filters 120, condenser 48, filter 118, filter 116 and manual outlet valve 130.

Referring to FIG. 1, it is seen that the hydraulic cylinders 126 controlling the trap doors 24 are controlled in parallel by a solenoid valve 132 connected to the motor operated hydraulic pump 134.

The process gases produced by the batch process are fed to flare 58 through open solenoid valve 136 and flame arrester 138.

The process gases of minimum hydrocarbon content are fed to reservoir 62 through solenoid valve 140, flame arrester 142, check valve 144 and manual valve 146.

Natural gas reservoir 15 feeds the gas burner 14 when its solenoid valve 148 is open. Process gas from reservoir 62 is fed to burner 14 when valve 148 is closed and through the following circuit; manual valve 150, check valve 152, flame arrester 154, filter 156, motor operated circulating pump 158, check valve 160, open solenoid valve 162 and line 66.

The water tower 88 used in the cooling circuit of condenser 48 is provided with a solenoid valve 164 which is temperature regulated to discharge water into reservoir 90 at a temperature of about 1° C. The water level in reservoir 90 is controlled by a float valve 166 connected to a water source through manual valve 168. Water reservoir 90 may be emptied through manual drain valve 170. Cold water from reservoir 90 is circulated by pump 92 through normally open manual valve 172.

Circulating pump 84 for cooling circuit 74, 76, 78, 82 is fitted with inlet and outlet manual valves 174.

Line 54 which feeds the oil from separator 44 to oil reservoir 52 is fitted with a solenoid valve 174 and a check valve 176. The bottom of separator 44 is also connected to reservoir 52 through a by-pass line 178 fitted with a solenoid valve 180; separator 44 has also a drain valve 182.

The recycled oil from reservoir 52 is pumped into tank truck 56 by pump 184 through manual valve 186, solenoid valve 188 and oil meter 190.

Line 40 of vacuum pump 38 is provided with a solenoid valve 191 and a check valve 192. Pump 38 is connected in parallel with circulating pump 70 between lines 42 and 60. The line of pump 70 includes solenoid valve 193, filter 194 and check valve 196. By-pass line 198 connects lines 42 and 60, by-pass line 198 is fitted with pressure regulating valve 200.

Referring to FIG. 1, process gas reservoir 62 has a by-pass line 202 connecting the same directly to the flare 58 at the inlet of the flame arrester 138; by-pass line 202 is fitted with a pressure regulating valve 204. Thus, in case of accidental over-pressure, reservoir 62 is discharged to flare 58.

Figure 3:
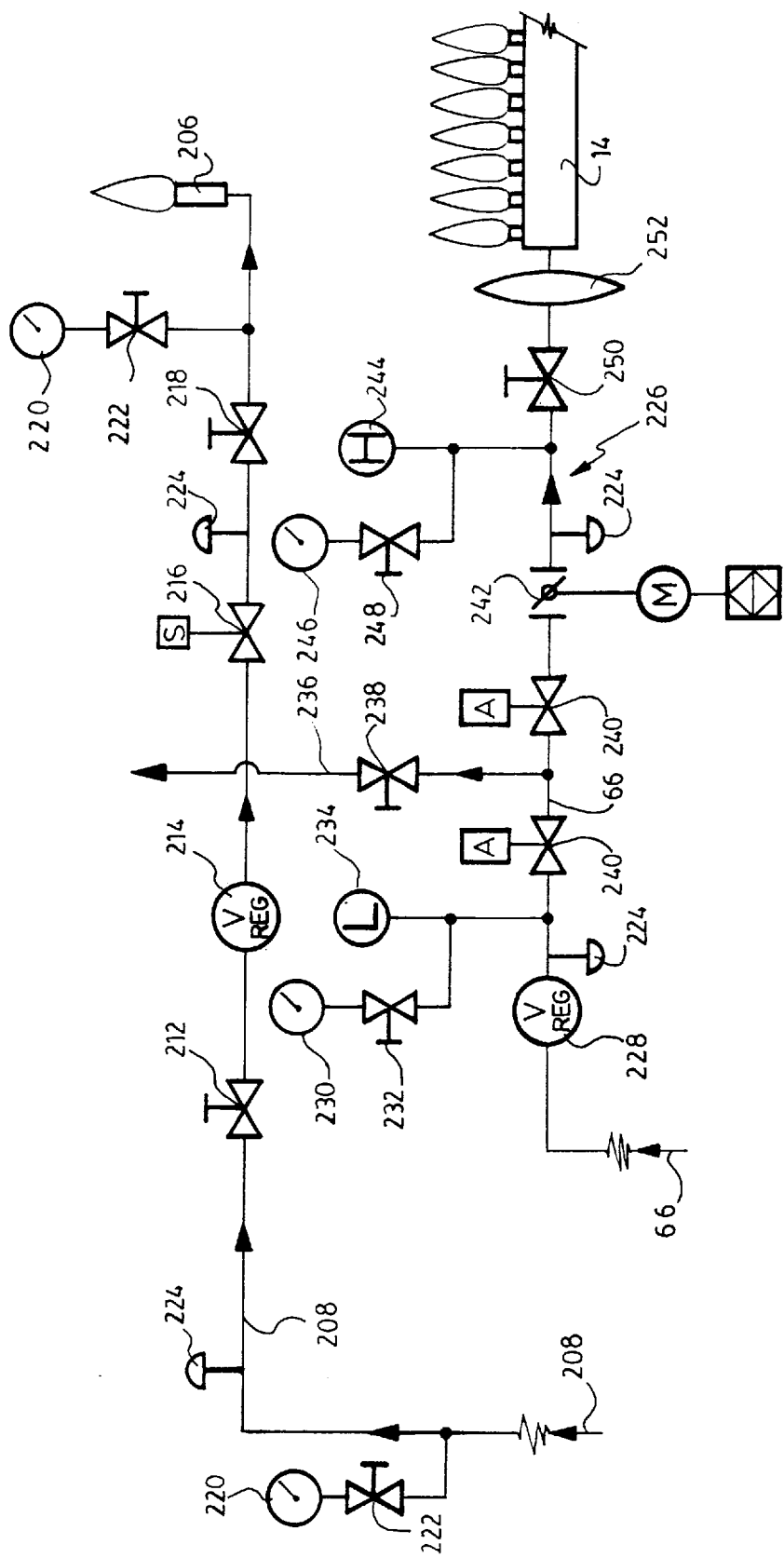
FIG. 3 is a flow diagram of the system for operating the gas burner for heating the reactor used in the pyrolysis process.

Natural gas reservoir 15 feeds pilot light 206 of gas burner 14 through the following circuit, (see FIGS. 1 and 3): line 208 connected to the outlet line of reservoir 15 between two manual valves 210, manual valve 212, pressure regulating valve 214, solenoid operated shut-off valve 216, manual valve 218 and pilot light 206. Manometers 220 with a manual shut-off valve 222 is connected to line 208, the last one just ahead of pilot light 206. Gas leak verifying points 224 are also installed on pilot light line 208. The burner controls in line 66 are shematically indicated in box 226 in FIG. 1 and are detailed in FIG. 3 as follows: In line 66 are series connected a pressure regulating valve 228, a manometer 230 with its manual valve 232, a low pressure switch 234, a drain line 236 with its manual valve 238 connected as a by-pass to line 66 between two motorized timer valves 240 set for about 13 seconds. Valves 240 are normally opened but shuts off if burner 14 has failed to light after 13 seconds.

Down stream from the last timer valve 240 is a motorized butterfly valve 242 which effects variable gas admission to burner 14 so as to vary the heating capacity of the burner. A high pressure switch 244 together with a manometer 246 and its manual valve 248 are connected to line 66 down stream from butterfly valve 242. Down stream from this connection is a manual valve 250 and a flame arrester 252 just prior to burner 14. Line 66 is also provided with leak verifying points 224.

The reactor and the equipment circuit are provided with sensors for measuring the following parameters: pressure, temperature, oxygen, carbon monoxide, carbon dioxide, and total hydrocarbon content. The readings together with the commands for operating the motorized valves and the solenoid valves and the gas burner control butterfly valve 242 are transmitted and received to and from a central command computer by data transmitters and receivers indicated at 254. Automated operation of the reactor can be achieved except for the reactor loading and unloading operations.

Chimney 18 is equipped with three sensors 256 for analyzing the total carbon content, the carbon monoxide content and the oxygen content of the effluent gases from the burner 14. Air is injected onto the chimney sensors 258 by a motorized air fan 258 to cool these sensors. Analysis of the composition of the gases produced by the reactor is effected in line 60 down stream from the pumps 38 and 70 by sensors 260 for analyzing and transmitting the percentage data of oxygen, carbon monoxide, carbon dioxide and total hydrocarbon content. (see FIG. 2) An infra-red sensor 262 located in the space between sheath 16 and the reactor drum 2 reads the temperature within that space and transmit the same. Sensors 264 read the temperature and pressure within drum 2 above the solid material contained in reactor 2. A temperature sensor 266 mounted at the end of a rod 268 fixed to the discharge tube 32 reads and transmits the temperature of the tire rubber cuttings inside the drum. Flame rods 270 at both ends of the elongated burner 14 transmit a signal to the computer if the burner nozzles have failed to ignite, so as to stop operation of the burner. Operations of the air fans 28, 68 and of the variable speed motor 10 can be controlled also from the central computer as indicated by data transmitter and receiver 272. Nitrogen source 106 is equipped with a pressure sensor 274 which sounds an alarm if the pressure of the nitrogen source is too low. Another pressure sensor 276 on line 108 monitors the pressure of the nitrogen fed from reservoir 106 to line 50. To measure the amount of filter clogging, a differential pressure sensor 278 measures and transmits the differential pressure across filter 116, and a similar differential pressure sensor 280 is connected across the inlet of filter 118 and the outlet of filter 120. Temperature sensors 282, 284 read the temperature of the gases and vapors flowing through line 50 upstream and down stream from condenser 48. A pressure sensor 286 and a temperature sensor 287 read the pressure and the temperature of the cooling fluid entering condenser coil 72 through line 74. A pressure sensor 288 reads and transmits the pressure in line 46 downstream from condenser 48. Separator 44 is equipped with a high level sensor 290, a medium level sensor 292 and a low level sensor 294. Sensors 292, 294 modulate the operation of outlet valve 174 to oil reservoir 52 while high level sensor 290 opens normally closed valve 180 to provide an additional by-pass discharge of the separator into reservoir 52. Reservoirs 82 and 90 are equipped with a low level alarm sensor 198. Pressure sensor 300 and temperature sensor 302 are mounted on line 96 downstream from pump 92.

The following is an example of the batch process of the present invention.

A reactor 2 of 20' in length and 8' in diameter was used. Six tons (12,000 pounds) of used rubber tires which is equivalent to about 600 tires where first cut up in pieces of about 4"×4" and loaded as tire cuttings into the stationary reactor drum 2 with the reactor access door 30 at 12.00 o'clock. The door was closed in air tight manner and the vacuum pump 38 started until a vacuum of 29.9 mm of mercury was reached inside the drum. The drum was then driven at a low speed of 1.5 RPM and the burner 14 was started using natural gas from reservoir 15 at the start of first batching operation. Heating was carried out at about 50% of the burner capacity for 10 minutes then 90% of the burner capacity for the consecutive 35 minutes at which time exorthermic reaction started at about 435 degrees C., at which time heating was lowered to 10% of burner capacity and the vacuum pump 38 was stopped and valve 191 was closed to thus positively prevent secondary cracking reactions and to allow reactor internal pressure to increase by the production of process gases and vapors which started to be discharged through condenser 48 and separated in separator 44 with oil going to reservoir 52 and the process gases fed by by-pass line 198 and pressure regulating valve 200 to line 60 when the gas pressure was above 5 pounds psi and by recirculating pump 70 and open valve 191 for gas pressure below 5 psi. The initial process gases with a carbon content of lower then 50% as measured by the relevant sensor 260 were first directed to flare 58 by opening solenoid valve 136 and when analyzed to a 50% T.H.C. (50% total carbon content) were directed to reservoir 262 by closing valve 136 and opening valve 140. When sufficient process gas has accumulated within reservoir 162 as indicated by the pressure sensor 163, pump 158 was started. The process gases were fed to the burner 14 at the maximum pressure regulated by valve 228 (see FIG. 3) and the burner was modulated between 10% and full capacity by the motorized butterfly valve 242 as controlled from the computer.

The pressure inside the reactor 2 was regulated between 781 and 789 mm of mercury, so as to obtain maximum output of oil relative to the output of the process gas. To do so, reactor rotation and heating were modulated and only at the end of the batch operation when gas output started to decrease, was it necessary to start pump 70. The temperature at the inlet of the condenser 48 as determined by temperature sensor 282 varied during the entire batch processing operation between 460 and 496° C., while the temperature at the outlet of the condenser 48 as determined by temperature sensor 284 was varied between 4° C. and 52° C.

These pressure and temperature conditions and also the low drum rotational speed were kept until the total hydrocarbon content of the separated process gases became less than 50% at which time drum rotation was increased from 1.5 RPM to about 10 RPM for about 4 minutes and the speed was lowered again to 1.5 RPM, this cycle was repeated three times; due to its rapid stirring the solid residual material in the drum started to again emit process gas. As the end of the third stirring cycle, flare 58 stopped when the total carbon content of the process dropped to about 1 to 2%.

During the entire batching operation, effluent gases from the burner 14 were monitored as to their composition by the sensors 260 and chimney butterfly valve 20 and combustion air fan 68 were consequently modulated so as to discharge to the atmosphere environmentally acceptable combustion gases.

Upon completion of the batching operation, the trap doors 24 were open and air fan 76 was started to rapidly cool drum 2; when the drum temperature decreased to about 200° C. and with the drum stopped with its door at 12.00 o'clock, the door 30 was open and replaced by a dummy door; drum 2 was then rotated to a position with the dummy door at 6.00 o'clock, the dummy door was removed and the suction tube of a vacuum cleaner was held at about 18 inches from the door so as to prevent escape to the atmosphere of any powder in the drum. The suction tube, about 26 feet in length, was inserted within the drum and moved longitudinally of the drum to suck out the solid residues S namely carbon black powder and wire mesh which were sent to a separator so that the carbon black powder was recuperated and also the steel wire mesh from the rubber tires.

Total batching time for processing 12,000 pounds of tires took three hours and twenty minutes.

The following components were obtained expressed as a percentage of the weight of tires which were processed: 47% light oil which is equivalent to about 1.3 U.S. gallon per tire, process gas 11%, carbon black 32% and steel 10%. The carbon black was of a quality to be sold for use, for instance as dry ink in photocopying machines.

Oil analysis: An oil sample was supplied to a commercial laboratory and the following data was obtained: Density at 15° C.: 918.3 Kg /m$^3$; calorific value 1767.2 BTU /lb.; ketone index 34.5; viscosity at 40° C. 3.94 cSt; ashes 0.011% m. The oil was submitted to distillation; the initial boiling point was 64° C., 10% of the oil was recuperated at 137° C., 20% at 178° C., 30% at 220° C., 40% at 259° C., 50% at 299° C., 60% at 331° C., 70% at 358° C. and 90% was recuperated at 399° C. Cracking occurred at 92% of recuperation at 402° C., the flash point was 22° C., X-ray analysis showed a sulphur content of 0.85% m and a total halogen content of 713 ppm.

The carbon black obtained was also analyzed for impurities with the following results: Arsenic 1.71 mg/kg; cadmium 4.60 mg/kg; chlorides 2210 mg/kg; chrome 9.50 mg/kg; copper 410 mg/kg; petroleum hydrocarbons 720 mg/kg; mercury less than 0.05 mg/kg; nickel 11.5 mg/kg; lad 144 mg/kg, sulphur 4.05 mg/kg and zinc 48500 mg/kg. When burnt at 800° C., there was a carbon black loss of 83.9% of the carbon black sample.

It was found that 10 to 15% of the process gas obtained could be sold as a fuel gas, being excess to the process gas required for heating the reactor during the batch processing operation. The used tire recycling process in no way contaminated the atmosphere surrounding the reactor as it was found very easy to prevent escape of carbon black powder during reactor unloading.

It should be noted that natural gas is used as a source for the burners only at the start of the first batch operation since sufficient process gas is accumulated in reservoir 62 during the first batch operation for the start of the second and the subsequent batch operations.

It was also found that the two reactors 2 including sheath 16, chimney 20, burner 14 and immediate accessories could be installed in parallel to discharge gas to single processing equipment including the condenser 72 separator 44, reservoir 52 pumps 38 and 70 and other associated equipment so as to practically double the capacity of the installation.

The excess process gas in addition to that required for heating the reactor could be used as a fuel, for instance, for steam production.

I claim:

1. A pyrolysis batch process for recycling hydrocarbon containing used material comprising the consecutive steps of:

a) loading said material into a rotatable reactor and sealing closing the latter;

b) creating an at least almost complete vacuum and oxygen-free environment inside said reactor;

c) rotating said reactor about a substantially horizontal axis while heating the same from the exterior until exothermic reaction is initiated within said reactor;

d) regulating the reactor internal pressure above the level of atmospheric pressure upon initiation of and during said exothermic reaction to control and partially prevent gas and vapor phase cracking reaction;

e) continuing reactor rotation and heating while withdrawing therefrom condensable hydrocarbon vapors and gaseous hydrocarbons produced by said exothermic reaction;

f) condensing said vapors into oil and separately collecting said gaseous hydrocarbons; and g) unloading any solid residues from said reactor.

2. A batch process as defined in claim 1, further including using said gaseous hydrocarbons as collected in step f) as a fuel for heating said reactor in steps c) and f).

3. A batch process as defined in claim 1, further including air cooling said reactor between steps f) and g).

4. A batch process as defined in claim 2, further including air cooling said reactor between steps f) and g).

5. A batch process as defined in claim 1, wherein said material consist of used rubber tire cuttings, the at least almost complete vacuum and oxygen free environment in step b) is effected by withdrawing air by means of a vacuum pump until a sub-atmospheric pressure of less than about 35 mm of mercury is obtained within said reactor, the pump being stopped upon reaching this pressure inside the reactor; and heating of said in step c) is effected until the tire cuttings in said reactor attain a temperature of 435 degrees C. to 500 degrees C., and further including decreasing said external reactor heating upon initiation of said exothermic reaction, and wherein said solid residues unloaded in step g) include carbon black powder and steel wires.

6. A batch process as defined in claim 5, further including said gaseous hydrocarbons as a fuel for said reactor heating in steps c) and e).

7. A batch process as defined i claim 6, further including air cooling said reactor between steps f) and g).

8. A batch process as define in claim 2, further including the steps of continuously analyzing the total hydrocarbon content of the gaseous hydrocarbons collected in step f) and using as a fuel for heating the reactor only those gaseous hydrocarbons having more than about 50% total hydrocarbon content and burning to waste the remaining gaseous hydrocarbons.

9. A batch process as defined in claim 5, further including the steps of continuously analyzing the total hydrocarbon content of the gaseous hydrocarbons collected in step f) and using as a fuel for heating the reactor only those gaseous hydrocarbons having more than about 50% T.H.C. and burning to waste the remaining gaseous hydrocarbons.

10. A batch process as defined in claim 5, further providing flooding said reactor while under vacuum with pressurized inert gas upon atmospheric air leakage into said reactor.

11. A batch process as defined in claim 5, wherein reactor rotation and heating in step c) are effected at a low speed and high rate respectively, then during said exothermic reaction in steps d) and e), reactor heating is lowered while reactor rotation is kept the same speed.

12. A batch process as defined in claim 1, wherein the withdrawal of the hydrocarbon vapors and gaseous hydrocarbons in step e) is accomplished by means of a pump, and wherein said process further comprises the step of filtering the hydrocarbon vapors and gaseous hydrocarbons inside the reactor upon their withdrawal by said pump.

13. A batch process as defined in claim 11, further including the steps of continuously analysing the total hydrocarbon content of the gaseous hydrocarbons collected in step f) and further increasing the drum rotational speed and the drum heating when the total hydrocarbon content of the gases collected in step f) falls below 50% to cause increase of the total hydrocarbon content of the gases being collected and repeating this cycle at least two times to practically completely collect the hydrocarbon contents of said tire cuttings so as to leave substantially only carbon black and steel wires as solid residues in step g).

14. A batch process as defined in claim 13, wherein said rotatable reactor is of generally cylindrical shape with end walls, one end wall having an access opening offset with respect to the reactor rotation axis and wherein reactor loading in step a) is effected while said access opening is at substantially 12.00 o'clock and reactor unloading in step g) is effected while said access opening is at substantially 6.00 o'clock and by sucking away said solid residues.

* * * * *